May 19, 1925.  1,538,523

LE ROY W. STAUNTON

GEARING FOR INSTRUMENT DIALS

Filed June 9, 1924

LE ROY W. STAUNTON INVENTOR.

BY John B. Brady
ATTORNEY.

Patented May 19, 1925.

1,538,523

UNITED STATES PATENT OFFICE.

LE ROY W. STAUNTON, OF NEW YORK, N. Y., ASSIGNOR TO C. BRANDES, INC., OF NEW YORK, N. Y., A CORPORATION OF NEW YORK.

GEARING FOR INSTRUMENT DIALS.

Application filed June 9, 1924. Serial No. 718,816.

*To all whom it may concern:*

Be it known that I, LE ROY W. STAUNTON, a citizen of the United States, residing at New York, in the county and State of New York, have invented a certain new and useful Improvement in a Gearing for Instrument Dials, of which the following is a specification.

My invention relates broadly to gearing and more particularly to an attachment whereby small angular changes in the position of a rotatable shaft may be readily secured.

One of the objects of my invention is to provide an attachment for panels adjacent an instrument dial whereby the instrument dial secured upon the extremity of a rotatable shaft may be moved through minute angular distances for accurately adjusting the position of apparatus controlled by the shaft.

Another object of my invention is to provide a device which may be readily mounted upon an instrument panel adjacent a rotatable dial for rotating the dial through small angular distances with self adjusting means for compensation of unevenness which may be inherent in any particular rotatable dial.

Still another object of my invention is to provide a frictional device for attachment to an instrument panel adjacent a rotatable dial operating both as a brake for the dial and a vernier rotation device whereby any tendency of the shaft to change its position under the influence of uneven distribution in weight of the apparatus controlled by the instrument shaft may be compensated for.

Still another object of the invention is to provide a readily attachable vernier device for an instrument dial enabling the dial to be rotated through small angular distances by a touch of the fingers whereby a shaft to which the dial may be connected may be moved through large angular distances under control of the dial and through small angular distances under control of the vernier device.

Figure 1:
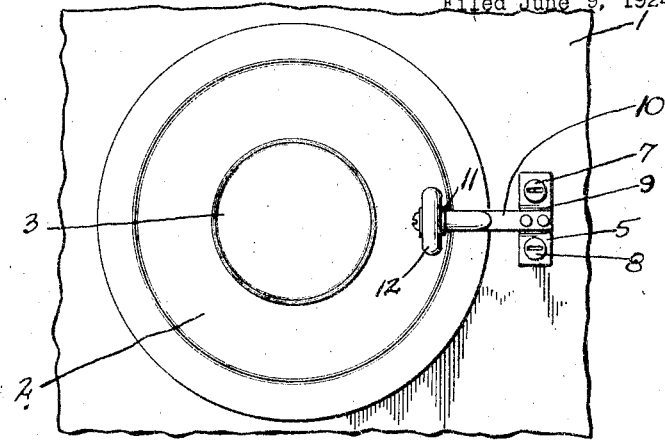
Figure 2:
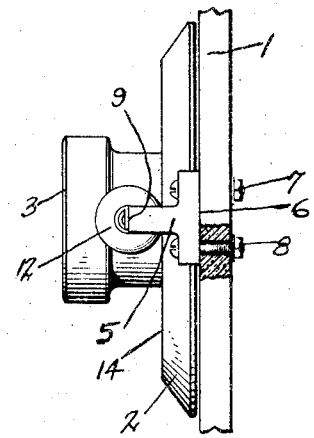
Figure 3:
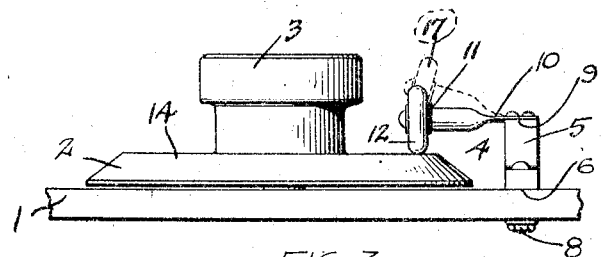
Figure 4:
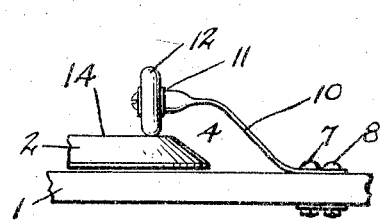

My invention will be more clearly understood by reference to the following specification and accompanying drawings in which:

Figure 1 is a plan view showing the instrument dial and the vernier attachment mounted upon an instrument panel; Fig. 2 is a side elevation partially in cross section showing one method of mounting the vernier device on the instrument panel at a point adjacent the instrument dial; Figs. 3 and 4 are views illustrating modified forms of vernier attachments for instrument dials constructed in accordance with my invention; and Figs. 5 and 6 illustrate still another method of readily attaching the vernier device upon an instrument panel adjacent the instrument dial.

In the adjustment of electrical circuits it is extremely important that the constants be adjusted to an extremely accurate value. The variable factors in an electrical circuit of this character are generally controlled by the rotative movement of a shaft. The shaft ordinarily projects through an aperture in a panel upon which is mounted the various controls for other parts of the electrical circuits. A dial is generally secured at the extremity of this shaft with a knob secured to the dial in such manner that the dial may be manually rotated by movement of the hand of the operator. I am aware that various constructions of dials have been suggested whereby the rotative movement of the shaft may be carried out through small angular degrees, but such dials have been inherently difficult and expensive in manufacture. Such dials have required special tools and molds for their manufacture and in order to secure the advantages of the improved construction it has been necessary to discard the well known disk type of dial from instrument panels already in use. My invention contemplates an attachment for the usual construction of dial. This device may be readily mounted upon an instrument panel adjacent the dial with a frictional contact between a rotatable wheel on the attachment and the surface of the rotative dial whereby the shaft controlled by the dial may be moved through extremely small angular distances depending upon the ratio of the diameter of the friction wheel and the distance between the line of contact of the friction wheel and the center of the rotative dial. The attachment may be readily secured upon the instrument panel by a device operating upon the principle of a vacuum cup whereby normal atmospheric pressure will maintain the device in position upon the panel or the panel may be drilled or tapped to enable small machine screws or bolts to be passed through the instrument panel to secure the attachment in place.

Referring more particularly to the drawings, reference character 1 indicates the instrument panel upon which the device of my invention may be mounted. The rotatable instrument shaft passes through panel 1 and carries on its extremity the rotatable dial 2 having a hand knob 3. Various constants of the electrical circuit may be varied by movement of the instrument shaft, by grasping knob 3 with the fingers, such as for example, a variation in inductance, capacity or resistance. The rotative movement of the shaft when knob 3 is moved by a twist of the fingers is possible through relatively large angular degrees. In order to provide means for adjusting the instrument shaft accurately in position through a range of small angular degrees I mount the attachment 4 on the instrument panel 1. This attachment may comprise a T shaped standard 5 as represented in Figs. 1, 2 and 3, the lower supporting face 6 of which abuts against the surface of panel 1 by drilling the panel 1 and passing small bolts 7 and 8 therethrough and securing the same by nuts on one side of the panel. The upper surface 9 of the standard 5 serves as a support for a laterally extending resilient member 10 forming at its extremity a bearing 11 for a friction wheel 12. The frictional surface of wheel 12 contacts with the surface 14 of the rotatable dial 2 whereby rotative movement is imparted to the instrument shaft. The degree of rotative angular movement imparted to the instrument shaft is dependent upon the ratio of the diameter of the friction wheel 12 and the distance from the center of dial 2 to the line of contact between the friction wheel 12 and the surface 14 of dial 2. The laterally extending resilient member 10 is formed in a flat spring strip portion throughout a part of its length and terminates in a tubular portion adjacent its extremity, forming a bearing 11 for the friction wheel 12. The end of the spring strip may be secured to the surface 9 of standard 5 or it may be directly secured to panel 1 as represented in Fig. 4 by passing bolts 7 and 8 through the end of the strip which rises at an angle from the surface of panel 1 with horizontal extensions on each side of the intermediate angular portion.

Figure 5:
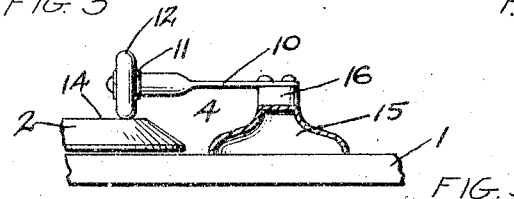
Figure 6:
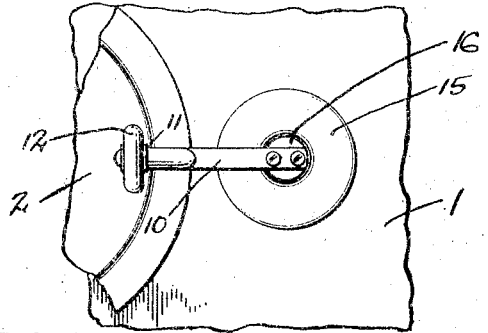

In order to facilitate the attaching of the vernier device to the instrument panel I may provide a vacuum cup 15 as represented in Figs. 5 and 6 constructed of relatively soft rubber or other resilient material and presenting a cup shaped surface to panel 1 with a top portion 16 upon which the resilient strip 10 is secured. Atmospheric pressure will maintain the vernier device in position with relation to the panel.

The vernier device is mounted in such manner that the friction wheel 12 is readily movable in a vertical direction as represented by dotted lines 17 in Fig. 3, whereby compensation is secured for any unevenness in the surface of the dial. The device may be adjusted with respect to the center of the dial whereby the distances between the center of the dial and line of contact of the friction wheel 12 may be selected to accurately adjust the dial through small angular distances. The friction wheel also acts as a brake for the dial 2 preventing it from revolving due to the eccentric mounting of the instrument to be controlled, such as the movable plates of a condenser, thereby insuring a smooth running dial which will remain in a particular position when so adjusted. Should the dial have a tendency to stick in any given position the friction wheel may be placed against the surface 14 enabling the dial to be pushed over the point of large friction. It will be understood that the device may be mounted at any point around the dial and that it may be readily attached and used with standard dials already provided on the instrument panel.

While I have described my invention in certain particular embodiments I desire that it be understood that modifications may be made and that no limitations upon the invention are intended other than those imposed by the scope of the appended claims.

What I claim and desire to secure by Letters Patent of the United States is as follows:

1. In a dial revolving device the combination of an instrument panel, a rotatable dial mounted adjacent thereto, a resilient member, one end of said member being secured to said panel adjacent said dial and the other end of said member carrying a rotatable friction wheel adapted to engage the surface of said dial whereby said dial may be rotated through small angular distances.

2. In a dial revolving device, the combination of an instrument panel, a rotatable dial mounted adjacent thereto, a readily attachable support adapted to be mounted on said instrument panel adjacent said rotatable dial, a resilient member laterally extending from said support and a friction wheel carried by the extremity of said resilient member in engagement with said dial whereby said dial may be rotated through small angular distances.

LE ROY W. STAUNTON.